Sept. 23, 1952 H. M. HUGE 2,611,889
REGULATED RECTIFIER
Filed March 23, 1948 2 SHEETS—SHEET 1

INVENTOR.
HENRY MARTIN HUGE
BY
Woodling and Krost
ATTORNEYS.

Patented Sept. 23, 1952

2,611,889

UNITED STATES PATENT OFFICE 2,611,889

REGULATED RECTIFIER

Henry M. Huge, Lorain, Ohio, assignor to Lorain Products Corporation, a corporation of Ohio Application March 23, 1948, Serial No. 16,579

7 Claims. (Cl. 321—25)

This invention relates to regulated rectifiers and particularly to an arrangement for maintaining a substantially constant rectified output voltage in spite of fluctuations of the input voltage and load.

Some of the circuit features described herein have been previously disclosed in my U. S. Patent application, Serial No. 780,408, filed October 11, 1947 and entitled "Battery Charger."

The present invention utilizes a rectifying arrangement in which the flow of current is controlled by impedance windings connected between the alternating current terminals and the direct current terminals, each winding being in series with a rectifying element. This method of regulating the flow of current provides several inherent advantages, the first being that the alternating current supplied and the rectified direct current flow through the same windings, so that each impedance winding also acts as a saturating winding. The saturation of the core on which the impedance winding is placed, therefore, increases with increasing load and the impedance correspondingly falls with increasing load. The voltage drop which would otherwise occur through the impedance winding is thereby substantially eliminated without need of any additional saturating windings placed on the core.

The voltage which is applied to the rectifier elements has, in this arrangement, a square wave shape, so that the peak inverse voltage which the rectifiers must sustain is minimized and the highest possible efficiency of rectification is obtained, while at the same time the number of rectifying elements is reduced to a minimum. Prior rectifier arrangements which made use of saturated reactors for controlling the flow of current to the rectifiers were, in general, characterized by the extremely high peaked voltage wave which they applied to the rectifier elements, requiring the use of a large number of rectifier elements in series. These prior arrangements also generally employed a direct-current saturating winding connected in series with the rectified output and wound on the magnetic core carrying the impedance windings, so that the inherent voltage drop through the windings and rectifiers might be compensated. These prior arrangements all introduced a relatively high resistance as well as a high inductance in the circuit, and at the same time produced a large ripple voltage in the rectified output. The addition of the necessary filter inductance further increased the total inductance and resistance, resulting in poor efficiency and poor dynamic response. The dynamic response is a particularly important factor in field applications where a keyed or interrupted load is connected to the rectified output. In such applications, the large series inductance of the prior circuits produced a high surge of output voltage when the load circuit opened, and a considerable drop in voltage when the load circuit closed.

In the present invention, the square-topped voltage wave which is fed to the rectifiers results in a minimum ripple voltage in the rectified output and, furthermore, the reactors which control the flow of current through the rectifiers also act as filter impedances, so that when a condenser is connected across the direct current terminals, a substantially smooth rectified output voltage is obtained without the need for any further filtering. Thus, by my invention, I have eliminated the inductance of the saturating winding and the inductance of the filter choke, as well as the resistnaces of these elements. The circuit arrangements of my invention are, therefore, in general, characterized by an extremely good dynamic response, so that rapid changes in the load current do not cause wide deviations in the output voltage. The reduction of the series resistance achieved by my invention also provides a considerable increase in efficiency over prior circuits. The reduction of resistance is not only in the regulating and filter windings, but also in the rectifier elements themselves, since the reduction in peak voltage permits a reduction in the number of rectifier elements connected in series.

The regulating impedances used in my invention are extremely sensitive to changes in control current, so that I am able to control the output voltage by the application of a very small amount of control power. This high sensitivity is obtained by saturating the core with the load current flowing through the impedance windings.

Because of this fact, I am able to compensate for A. C. input variations by the use of an extremely small saturable magnetic A. C. voltage regulator. The output voltage of the regulator is fed to a small rectifier bridge. The output voltage of this rectifier bridge is connected in parallel with the output voltage of the main rectifier thorugh the control winding which is on the same core as the impedance windings. When the output voltage of the power rectifiers falls below its normal value, current flows from the small rectifier through the control winding in a direction which increases the saturation of the core of the impedance windings. Their impedance is thereby reduced, and since they control the flow of current through the power rectifiers this action restores the output voltage substantially to its normal value. The small saturable magnetic A. C.

voltage regulator is thus capable of controlling the output voltage of the power rectifiers, even though its power output is only a small fraction of that delivered by the power rectifiers.

In order to economize on the size of the small rectifier which is energized from the saturable magnetic A. C. voltage regulator, I prefer to construct this portion of the circuit to deliver an output voltage which is a fraction of the voltage supplied by the power rectifiers. This output voltage is compared with a fraction of the total output voltage obtained through a voltage dividing resistor.

An object of the invention is to regulate the flow of current through a rectifier with a minimum of regulating equipment and with a minimum loss of energy.

Another object of the invention is to regulate the output voltage of a rectifying arrangement by the use of a saturable magnetic voltage regulator which handles only a small fraction of the total power.

Another object of my invention is to provide a regulated and filtered rectified output voltage which remains relatively constant in spite of sudden changes in load current.

Another object of my invention is to obtain a compounding effect, whereby the rectified output voltage may be caused to increase with increasing load.

Other objects of my invention will become apparent from the following specifications and claims, together with the accompanying drawings, in which:

Figures 1, 1A:
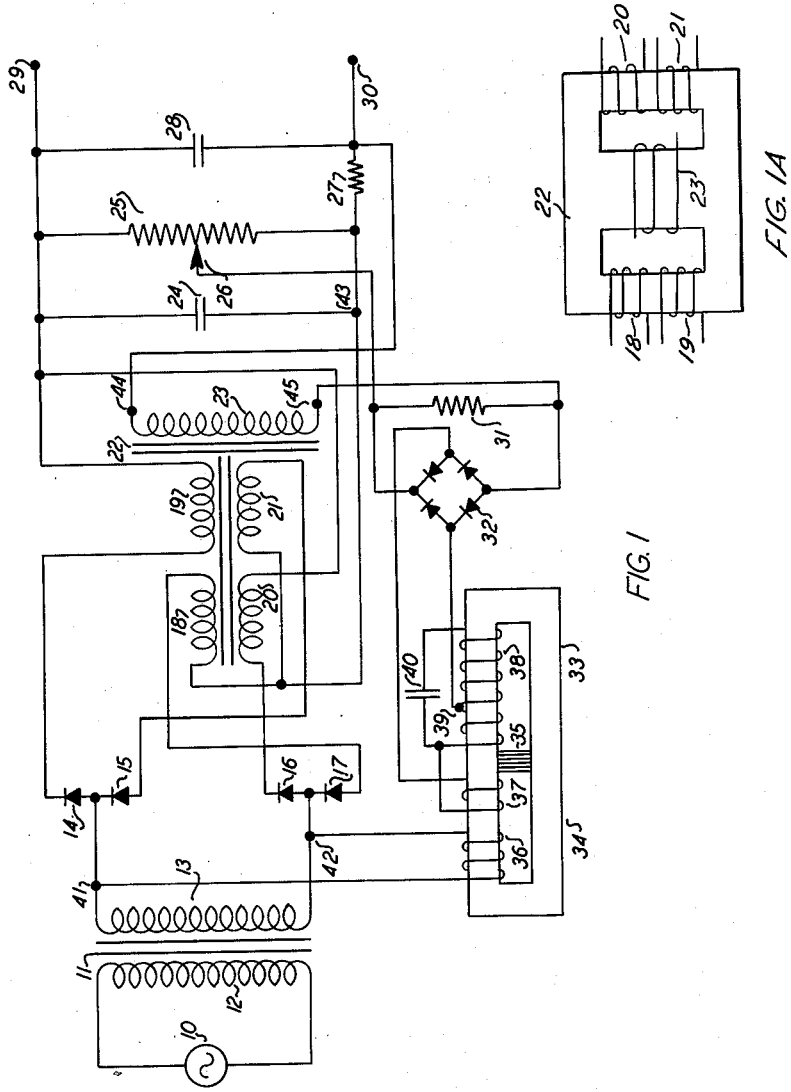
Figure 1 shows a complete circuit of an embodiment of my invention in which a single-phase rectifier bridge is controlled by a single three-legged reactor, which in turn has its control winding energized in response to the difference between a reference voltage and a fraction of the output voltage.
Figure 1A is a diagram of a magnetic core structure as used in Figure 1, showing the arrangement of the windings.

In Figure 1, there is shown an alternating current source 10, feeding the primary winding 12 of an insulating transformer 11. The secondary winding 13 of the transformer 11 supplies current to the input terminals 41 and 42 of the rectifier circuit.

The impedance windings 18, 19, 20 and 21 are connected between the alternating current input terminals 41 and 42 and the direct current terminals 29 and 43, the terminal 43 being in advance of the output terminal 30. The rectifier elements 14, 15, 16 and 17 are likewise connected between the alternating current terminals and the direct current terminals, each of the reactance windings being connected in series with one of the rectifier elements. Thus, between terminal 41 and terminal 29, the winding 19 and the rectifier element 14 are connected in series. Between terminal 41 and terminal 43, the rectifier element 15 and the winding 21 are connected in series. Between terminal 42 and the direct current terminal 29, the rectifier element 16 and the impedance winding 20 are connected in series, and between terminal 42 and direct current terminal 43, the rectifier element 17 and the impedance winding 18 are connected in series. The flow of current through each of the rectifier elements is regulated by the impedance of the winding with which it is connected in series.

The impedance windings 18, 19, 20 and 21 are arranged on the three-legged saturable magnetic core structure designated symbolically by the T-shaped figure 22, in which the cross-bar of the T designates the central core member and the stem of the T designates the two outer core members. Thus, the magnetic core structure designated symbolically by the T-shaped figure 22 has first, second and third core members, the windings 18 and 19 being on the first core member, the windings 20 and 21 on the second core member, and the winding 23 being on the third core member. The arrangement of the windings on the three-legged core structure 22 may be more clearly visualized by referring to Figure 1A, which is a diagram of a three-legged magnetic core structure 22. The windings 18 and 19 are on the first or left-hand core member, the windings 20 and 21 are on the second or right-hand core member, and the winding 23 is on the third or central core member.

The impedance windings are polarized so that the direct current magnetization produced in the central core member by the current flowing through the windings 18 and 19 aids the direct current magnetization produced in the central core member by the current flowing through the windings 20 and 21. When the terminal 41 is positive with respect to terminal 42, direct current may flow through the rectifier 14 and the winding 19 to the positive direct current terminal 29, and from the negative direct current terminal 43 through the winding 18 and rectifier element 17 to the alternating current terminal 42. It is thus apparent that the current flows through winding 18 at substantially the same instant that it flows through winding 19. During this portion of the cycle the windings 20 and 21 are substantially de-energized, as the rectifier elements with which they are connected in series have the voltage applied to them in the blocking direction.

When the alternating current terminal 42 become positive with respect to terminal 41, the current flows through rectifier element 16 and impedance winding 20 to direct current terminal 29 and from direct current terminal 43 through winding 21 and rectifier element 15 to the alternating current terminal 41. Of course, the current can flow only during the portion of the cycle during which the alternating voltage exceeds the voltage across the terminals 29 and 43. Thus, the two impedance windings on the one core member of the three-legged core structure 22 carry current during a portion of the one-half-cycle and the two impedance windings on the other core member of the three-legged core structure carry current during the other half-cycle. The current flowing through each of these windings consists of a uni-directional pulse and, therefore, comprises a direct current component as well as an alternating current component. It will be noted that the direct current components of current flow from left to right through the windings 18, 19, 20 and 21. The windings are polarized so that the direct current magnetization produced by this flow of current magnetizes the central core member upon which the winding 23 is wound. Inasmuch as the current flowing through windings 20 and 21 occurs one-half cycle later than the flow of current through windings 18 and 19, it is apparent that a 180-degree phase displacement exists between the alternating current components in these windings. Therefore, when the direct current components are polarized to magnetize the central core member, the alternating current components are in the opposite polarity so that the central core member upon which the winding 23 is wound is not subjected to an alternating current magnetization of the fundamental frequency.

When no load is connected across the output terminals 29 and 30 there is very little current flowing through the impedance windings 18, 19, 20 and 21, and these windings, therefore, have a high value of impedance. However, when the load current increases, the direct current component of magnetization through these windings increases also, so that the core structure designated symbolically by the T-shaped figure 22 becomes saturated and the impedance of the windings diminishes with increasing load current.

The rate at which the impedance of the windings changes may be sufficient to compensate for the voltage drop through the rectifiers and other circuit resistances, so that the output voltage may be held substantially constant with increasing load current. Normally, the circuit constants are proportioned so that the rate of change of impedance is approximately sufficient to counteract the voltage drops in the circuit, and substantially constant output voltage may be maintained. As the rectifiers age, the voltage drop through these elements increases, and consequently the output voltage may not remain constant as it did originally. Furthermore, it is extremely difficult to obtain the precise rate of change of impedance which is needed over the entire range of load current, so that under some conditions the voltage may drop at light loads and then rise again as the load increases.

Both of these difficulties are overcome by the use of the control winding 23 in the embodiment of my invention shown in Figure 1. Furthermore, the discussion, thus far, has not mentioned the variation in voltage which is normally experienced across the alternating current terminals 41 and 42. The variations in the input voltage as well as the other variations just mentioned are automatically corrected according to my invention by the use of the voltage regulator combination shown in Figure 1, comprising the magnetic core structure having the primary core portion or side 34 and the secondary core portion or side 33. The primary winding 36 on the primary side 34 is energized from the alternating current terminals 41 and 42. The secondary winding 38 on the secondary side 33 has the capacitor 40 connected across it. The magnetic shunt members 35 are arranged between the primary and secondary sides of the core.

With this arrangement, the magnetizing current flowing through capacitor 40 causes the secondary side 33 of the core structure to become saturated. The voltage produced across winding 38 is, therefore, relatively constant and independent of the variations in the voltage across the input terminals 41 and 41. The winding 38 is provided with a tap 39 for the provision of the desired low output voltage. A compensating winding 37 is wound on the primary side 34 of the core and is connected in series with the portion of the winding 38 terminated at tap 39 so that a low output voltage is supplied to the rectifier bridge 32. The voltage developed across winding 37 opposes the voltage developed across winding 38, so that as the input voltage across winding 36 increases, the voltage across winding 38 increases slightly and the voltage across winding 37 increases in direct proportion to that across winding 36. By subtracting the voltage across winding 37 from the voltage developed across the portion of winding 38 terminated at tap 39, a reverse output voltage characteristic is obtained, and the increasing voltage across winding 36 results in a decreasing voltage across the rectifier bridge 32. Furthermore, as the load drawn from the rectifier bridge 32 increases, the phase shift which occurs between the voltage across winding 38 and that across winding 37 increases the voltage to the rectifier bridge 32. This increase in voltage may be more than enough to compensate for the drop in voltage through the rectifier bridge 32, so that a "climbing" output voltage characteristic is obtained across the resistor 31.

This portion of the circuit differs somewhat from that used in the circuits shown in my patent application Serial No. 780,408, in which a source of reference potential with a substantially constant output voltage was used. The reason for this change lies chiefly in the method of comparing the reference voltage, which is the voltage across resistor 31, with the rectified voltage, which is the voltage across terminals 29 and 43. Instead of providing a source of reference potential having the same output voltage as the voltage across terminals 29 and 43, the reference source supplies a considerably lower output voltage. This is done chiefly in order to effect an economy in the components of the reference rectifier bridge 32. Since the reference voltage is only a fraction of the output voltage, I provide a voltage divider circuit so that the reference voltage may be compared with the proper fraction of the output voltage. For this purpose, the resistor 25 is connected across the output terminals 29 and 43 and is provided with a slider 26 which may be adjusted to provide the desired fraction of the output voltage. The output voltage of the reference rectifier 32 is connected in parallel with this fraction of the rectified voltage across terminals 29 and 43, through winding 23 on control reactor 22.

The circuit operates as follows: the voltage appearing at the slider 26 fluctuates in response to the fluctuations in the rectified voltage across terminals 29 and 43. The voltage across winding 23 depends on the difference between the voltage across resistor 31 and that across the lower portion of resistor 25. Current flows through the winding 23 in response to this difference in voltage, the direction of the current flow being such as to correct for the fluctuations in the rectified output voltage. If it were not for the voltage drop through the resistances in the circuit, the flow of current through the winding 23 would substantially eliminate the variations in the output voltage. When the output voltage falls below the voltage determined by the reference source rectifier 32, the current flows through winding 23 in a direction to aid the saturation of the magnetic core structure 22, and thereby increase the output voltage until it reaches the desired regulated level. Conversely, if the voltage across the terminals 29 and 43 increases above the voltage determined by the reference rectifier 32, then the current flows in the opposite direction through the winding 23, being absorbed through the resistor 31, and reduces the magnetization of the core structure 22 to reduce the output voltage to the desired level.

In order to completely eliminate all output voltage variations, it is necessary for the voltage across resistor 31 to remain constant during this process and the current flowing through winding 23 must reach a large value for an infinitesimal change in the output voltage. In the arrangement shown in my pending application Serial No. 780,408, these idealized conditions were closely approached, so that the output voltage could be maintained constant to a very high degree of accuracy, simply by the provision of a reference source which would compensate for the voltage drop through the control winding or windings, which in this case would be the winding 23. However, in the circuit shown in Figure 1 of this present application, the flow of current through the winding 23 results not only in a slight voltage drop through winding 23 but in a considerable voltage drop through the voltage dividing resistor 25. Therefore, when the voltage of source 10 increases, the regulating action changes the flow of current through winding 23 in such a manner as to increase the impedance of the impedance windings, this change in the current flow through winding 23 results in a change in the voltage at the slider 26. In order to correct for this change in the voltage at the slider 26 the reference voltage developed by the rectifier 32 must vary in an inverse manner and in a sufficient amount to just compensate for the change in voltage at the slider 26 as well as the voltage drop through the winding 23. This action is accomplished by causing the output voltage on the rectifier 32 to increase when the voltage of source 10 decreases and vice-versa. By providing the proper inverse voltage characteristic, it is possible to compensate, not only for the change in voltage at the slider 26, but also for the change in voltage drop through the winding 23.

The method of obtaining this inverse voltage characteristic has already been described, and it is possible to obtain the desired amount of voltage climb or drop across the resistor 31 to compensate for the variations in voltage of source 10. However, it is also necessary to correct for the effect of load on the output terminals 29 and 30. As previously mentioned, the voltage drop through the rectifier elements will vary with time and, of course, the voltage drop through the impedance windings will vary with the temperature of these windings as well as with the degree of saturation of the core. The compensation for these factors requires that under some conditions, the magnetizing current through the winding 23 shall increase with increasing load current. Here again, the variation in the voltage at the slider 26 with the changes in current through winding 23 creates a problem. To overcome this variation, the output voltage of the rectifier 32 should increase with increasing load from the rectifier at a rate just rapid enough to compensate for the voltage drop through the winding 23 and the voltage dividing resistor 25. It can be seen that to minimize the voltage drop through the resistor 25, it would be necessary to use a low value of resistance. Too low a value of resistance is undesirable, since the resistor is a load on the rectifier circuit. It is, therefore, necessary to compromise on a relatively high value of resistance for the resistor 25, and to make up the variation in voltage by other means.

I am able to obtain an increasing voltage characteristic from the rectifier 32, so the voltage increases as the current delivered by rectifier 32 increases, but the greater the voltage climb that is required, the more difficult it becomes to maintain a uniform rate of increase. I have found that this difficulty may be overcome by the insertion of resistor 27 in the output circuit. The resistor 27 introduces a voltage drop in series with the output of the rectifier. This might appear to be a disadvantage rather than an advantage, but actually the voltage drop thus introduced may be very small. The advantage in using the resistor 27 arises from the fact that the reference voltage is compared not with the entire output voltage but only with a fraction thereof. Thus, for example, if the reference voltage is compared with one-fifth the output voltage, and the resistor 27 introduces a one per cent voltage drop in series with the load, then this voltage drop which appears in the circuit between the reference source 32 and the voltage divider 25, appears as a five per cent variation in the voltage against which the reference voltage is compared.

When a voltage drop occurs through the resistor 27, the reference rectifier 32 is aided in supplying the required additional current through the winding 23, since the voltage developed across resistor 27 adds to the voltage of the reference rectifier 32.

I have found that this arrangement, making use of the resistor 27 to produce a compounding effect, results in an improved regulation characteristic in my rectifier circuit.

It should be pointed out, that the leakage-reactance type of voltage regulator which supplies the rectifier bridge 32, has been shown merely as an example and that many other types of regulator circuits might be used to obtain substantially the same results. Particular attention is here called to the arrangements shown in my previous application Serial No. 780,408, although there are also many other known types of voltage regulator which may be used in the practice of my invention.

The filter condenser 24 connected across the direct current terminals 29 and 43, provides a path for ripple current produced by the rectifiers. As mentioned before, the voltage impressed on the rectifiers has a square-topped wave shape, so that the ripple voltage appearing across the output terminals is considerably less than normally obtained with rectifier circuits. The provision of the filter condenser 24 further improves this situation, causing the voltage across the rectifiers to be even more flat-topped and eliminating the largest percentage of the ripple from the output voltage. This action depends upon the impedance windings 18, 19, 20 and 21 which are in series with the rectifier elements. Under this condition these impedance windings also act as filter windings since the alternating current drawn by the condenser 24 produces an A. C. voltage drop through these windings and substantially eliminates the alternating current from the direct current circuit.

The second filter condenser 28 which is connected across the output terminals 29 and 30 acts to further filter the output voltage when a completely filtered output is required. The use of the two capacitors 24 and 28, one of each side of the resistor 27 tends to give the effect of a two stage filter in which the resistor 27 acts as a series impedance element. Where an extremely high degree of filtering is required, the resistance 27 may represent the resistance of an inductance winding, and a complete two stage filter is then provided. Normally, however, either one of the condensers 24 or 28 is adequate to provide all the filtering that is necessary, and the other condenser may be omitted. When the load connected across the output terminals 29 and 30 has a low impedance to alternating currents, such as a battery load, both of the condensers 24 and 28 may be omitted and a smooth output voltage will be obtained.

Figure 2:
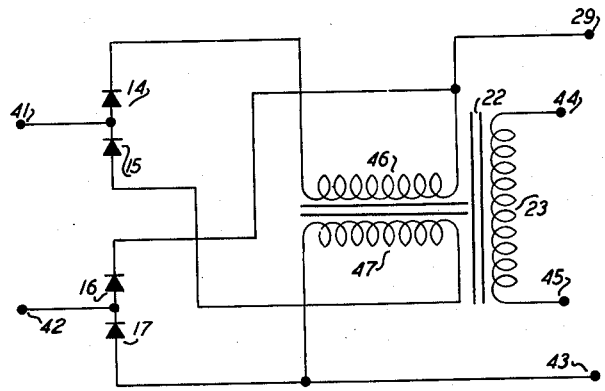
Figure 2 is a fragmentary view of the circuit, showing an alternative arrangement for the regulating reactor shown in Figure 1.

The circuit shown in Figure 2 is a portion of the circuit of Figure 1, having a modified impedance winding arrangement. In the circuit of Figure 2, only two impedance windings 46 and 47 are used. These are placed on the two outer legs of the three-legged core structure shown symbolically by the T-shaped figure 22 as in Figure 1. The winding 23 on the central core member is the same as in Figure 1. Impedance winding 46 in Figure 2 is connected between alternating current terminal 41 and the direct current terminal 29 in series with the rectifier element 14. The impedance winding 47 is connected in series with the rectifier element 15 between the alternating current terminal 41 and the direct current terminal 43. The rectifier elements 16 and 17 are connected directly between the alternating current terminal 42 and the direct current terminals 29 and 43 respectively. The magnetizing forces in the circuit with this arrangement of impedance windings are essentially the same as in Figure 1, when the winding 46 is equivalent to the windings 18 and 19 in series and the winding 47 equivalent to the windings 20 and 21 in series. The arrangement of the windings on the core 22 directly follows the pattern diagrammed in Figure 1A. It was explained in connection with Figure 1 that when the winding 18 carries current, the winding 19 also carries current at substantially the same instant. In the circuit of Figure 2 the current is passed through only one winding and on the return from the other direct current terminal, it goes directly through a rectifier element to the other alternating current terminal. The operation obtained with the circuit of Figure 2 is, therefore, substantially the same as that obtained with the arrangement shown in Figure 1. The only difference which exists is found in the peak inverse voltage across the rectifier elements. It is found that in the circuit of Figure 2 the peak inverse voltages are not exactly equal across all of the elements.

Figure 3:
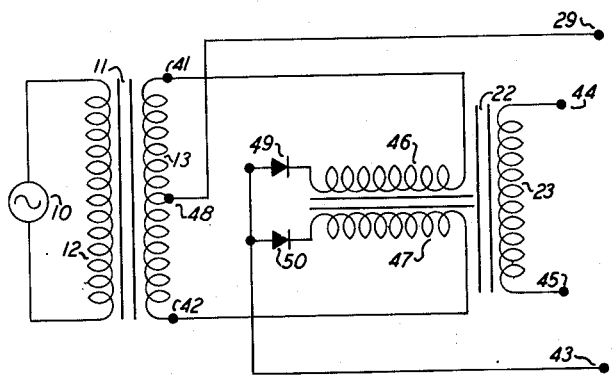
Figure 3 is, likewise, a fragmentary view of the circuit, similar to that of Figure 1, except that a center-tapped transformer and rectifier combination is used.

The circuit shown in Figure 3 is also a fragmentary view of a circuit which may be used in place of the equivalent portion of Figure 1. A circuit shown in Figure 3 makes use of a center-tapped rectifier connection in which the winding 13 on the transformer 11 is provided with the center tap 48 which goes directly to the direct current terminal 29. The rectifier elements 49 and 50 are connected one in series with each of the windings 46 and 47 between the other output terminal 43 and the two input terminals 41 and 42. As in the arrangement of Figure 2 the winding 46 conducts current for at least a portion of one-half-cycle of alternating current and the winding 47 conducts current during the equivalent portion of the other half-cycle. The wave shape of the current through the windings is substantially the same in all of the figures and consequently the operation is, for practical purposes, the same. The control winding 23 is shown having terminals 44 and 45 in all of the figures, which terminals may be energized as shown in Figure 1 or by other suitable means.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A regulated rectifying arrangement comprising in combination, a plurality of alternating current terminals, a pair of direct current terminals, magnetic core means, first and second winding means on the magnetic core means, rectifying means, said first winding means and said rectifying means being connected in series between said alternating current terminals and said direct current terminals, a voltage divider connected across said direct current terminals, a reference rectifier, means for energizing said reference rectifier with an alternating voltage which varies oppositely as the voltage across said alternating current terminals varies, a resistor connected to one of said direct current terminals and traversed by load current, and a circuit extending from one of said direct current terminals to an intermediate point on said voltage divider and including said resistor, said reference rectifier and said second winding means in series.

2. In combination, first and second alternating current terminals, first and second direct current terminals, a magnetic core structure having first, second and third core members, a plurality of rectifier elements, first, second, third and fourth windings, the first and second windings being on the first core member, the third and fourth windings being on the second core member, the first winding being connected between the first alternating current terminal and the first direct current terminal in series with one of said rectifier elements, the second winding being connected between the second alternating current terminal and the second direct current terminal in series with another of said rectifier elements, the third winding being connected between the first alternating current terminal and the second direct current terminal in series with another of said rectifier elements, the fourth winding being connected between the second alternating current terminal and the first direct current terminal in series with another of said rectifier elements, a fifth winding, said fifth winding being on the third core member, and means for energizing the fifth winding to control the voltage across the direct current terminals.

3. In combination, an alternating current circuit, a direct current circuit, a plurality of impedance windings, a plurality of rectifier elements interconnecting said alternating and said direct current circuits, one of said rectifier elements being in series with each of said impedance windings, a magnetic core structure having first, second and third core members, said impedance windings being on the first and second core members, a control winding on the third core member, a saturable magnetic A. C. voltage regulator, a reference rectifier connected to said voltage regulator, a voltage divider connected across said direct current terminals, a resistor connected to one of said direct current terminals and traversed by load current, and a circuit extending from one of said direct current terminals to an intermediate point of said voltage divider, and including said reference rectifier, said resistor and said control winding in series.

4. In combination, first and second alternating current terminals, first and second direct current terminals, a magnetic core structure having first, second and third core members, first, second and third windings on said first, second and third core members respectively, a plurality of rectifier elements, said first winding being connected in series with one of said rectifier elements between said first alternating current terminal and said first direct current terminal, said second winding being connected in series with another of said rectifier elements between said first alternating current terminal and said second direct current terminal, another of said rectifier elements being connected between said second alternating current terminal and said first direct current terminal, another of said rectifier elements being connected between said second alternating current terminal and said second direct current terminal, a saturable magnetic alternating current voltage regulator, a reference rectifier connected to said voltage regulator, and a circuit extending from the first to the second direct current terminal and including the reference rectifier and the third winding in series.

5. In combination, first and second alternating current terminals, first and second direct current terminals, a magnetic core structure having first, second and third core members, first, second and third windings on said first, second and third core members respectively, a plurality of rectifier elements, said first winding being connected in series with one of said rectifier elements between said first alternating current terminal and said first direct current terminal, said second winding being connected in series with another of said rectifier elements between said first alternating current terminal and said second direct current terminal, another of said rectifier elements being connected between said second alternating current terminal and said first direct current terminal, another of said rectifier elements being connected between said second alternating current terminal and said second direct current terminal, an alternating current voltage regulator, a reference rectifier energized from said alternating current voltage regulator, and a circuit extending from the first to the second direct current terminal and including said third winding and said reference rectifier in series.

6. In combination, first and second alternating current terminals, first and second direct current terminals, a magnetic core structure having first, second and third core members, a plurality of rectifier elements, first, second, third and fourth windings, the first and second windings being on the first core member, the third and fourth windings being on the second core member, the first winding being connected between the first alternating current terminal and the first direct current terminal in series with one of said rectifier elements, the second winding being connected between the second alternating current terminal and the second direct current terminal in series with another of said rectifier elements, the third winding being connected between the first alternating current terminal and the second direct current terminal in series with another of said rectifier elements, the fourth winding being connected between the second alternating current terminal and the first direct current terminal in series with another of said rectifier elements, a fifth winding, said fifth winding being on the third core member, an alternating current voltage regulator, a reference rectifier energized from said alternating current voltage regulator, and a circuit extending from the first to the second direct current terminal and including said fifth winding and said reference rectifier in series.

7. In combination, first and second alternating current terminals, first and second direct current terminals, a magnetic core structure having first, second and third core members, a plurality of rectifier elements, first, second, third and fourth windings, the first and second windings being on the first core member, the third and fourth windings being on the second core member, the first winding being connected between the first alternating current terminal and the first direct current terminal in series with one of said rectifier elements, the second winding being connected between the second alternating current terminal and the second direct current terminal in series with another of said rectifier elements, the third winding being connected between the first alternating current terminal and the second direct current terminal in series with another of said rectifier elements, the fourth winding being connected between the second alternating current terminal and the first direct current terminal in series with another of said rectifier elements, a fifth winding, said fifth winding being on the third core member, a voltage divider connected across said direct current terminals, a reference rectifier, means for energizing said reference rectifier, a resistor connected to one of said direct current terminals and traversed by load current, and a circuit extending from one of said direct current terminals to an intermediate point on said voltage divider and including said resistor, said reference rectifier and said fifth winding in series.

HENRY M. HUGE.

REFERENCES CITED

The following references are of record in the file of this patent:

UNITED STATES PATENTS

| Number | Name | Date |
| --- | --- | --- |
| 1,650,072 | Jones et al. | Nov. 22, 1927 |
| 2,012,588 | Logan | Aug. 27, 1935 |
| 2,040,492 | Logan | May 12, 1936 |
| 2,100,715 | Jenks | Nov. 30, 1937 |
| 2,157,977 | Alrig | May 9, 1939 |
| 2,403,891 | Lamm | July 9, 1946 |
| 2,503,880 | Mah | Apr. 11, 1950 |